United States Patent [19]

Coots et al.

[11] 4,257,151
[45] Mar. 24, 1981

[54] INSPECTION STATION FOR BEVERAGE CONTAINERS

[75] Inventors: James C. Coots, Marietta; Muir G. Howser, Dunwoody, both of Ga.

[73] Assignee: The Coca-Cola Company, Atlanta, Ga.

[21] Appl. No.: 23,341

[22] Filed: Mar. 23, 1979

[51] Int. Cl.³ .............................................. B23P 19/04
[52] U.S. Cl. ....................................... 29/240; 29/822; 53/367; 198/379; 198/394
[58] Field of Search ................. 29/240, 822, 823, 824; 81/57.36, 57.22, 57.44; 53/367; 198/394, 395, 379

[56] References Cited

U.S. PATENT DOCUMENTS

| | | | |
|---|---|---|---|
| 2,796,789 | 6/1957 | Rice et al. ............................ | 81/57.22 |
| 3,757,613 | 9/1973 | Arndt et al. ......................... | 81/57.22 |
| 3,993,199 | 11/1976 | Jorgensen et al. .................... | 198/379 |
| 4,164,281 | 8/1979 | Schnier ............................... | 198/394 |

*Primary Examiner*—James L. Jones, Jr.
*Attorney, Agent, or Firm*—Birch, Stewart, Kolasch & Birch

[57] ABSTRACT

An inspection station for FIGAL containers which automatically tightens the container valves during movement along a continuous conveyor is described. The containers are clamped in a rotary indexing mechanism which rotates the containers until a discrete opening molded in a top rubber skirt of the container is indexed on a latch mechanism adjacent the conveyor. A pair of pneumatically driven socket wrenches are then lowered onto the container and are rotated to tighten the valves. After a predetermined period of time, the tightening of the valves is discontinued, the next FIGAL container moves into the indexing mechanism, and the valves of that container are tightened by the pneumatically driven socket wrenches.

8 Claims, 6 Drawing Figures

INSPECTION STATION FOR BEVERAGE CONTAINERS

BACKGROUND OF THE INVENTION

1. Field of the Invention

The present invention relates to an indexing and valve tightening assembly for use on containers moving along a continuous conveyor. More specifically, the present invention is directed to a system which automatically tightens the valves on the top of a FIGAL syrup container, such as those normally used in post-mix beverage dispenser systems.

FIGAL containers as defined herein include containers similar to that illustrated in U.S. Pat. No. 3,186,577 to Tennison. The word "FIGAL" is an accepted abbreviation in the beverage dispensing art for a syrup container with a five gallon capacity.

2. Description of the Prior Art

Heretofore, FIGAL containers moving along a continuous conveyor through an inspection station have been visually inspected for cleanliness, and during inspection the syrup valves located on the top of the figal container have been manually tightened by the inspector. Obviously, the manual tightening of the syrup valves materially limits the speed at which the FIGAL containers can be inspected and the speed at which the valves thereon can be tightened. Accordingly, there is a need in the art for an apparatus which automatically tightens the syrup valves on the top of a FIGAL container, as the containers are rapidly transported along a continuous conveyor.

SUMMARY OF THE INVENTION

Accordingly, it is a primary object of the present invention to provide an apparatus which will automatically tighten the syrup valves located on the top of a FIGAL container at an increased rate of speed to that possible heretofore.

It is a further object of the present invention to provide an automatic valve tightening system which is disposed at the visual inspection station in a FIGAL filling system.

It is another object of the present invention to provide an indexing means for turning the FIGAL container to the proper orientation so that the syrup valves on the top thereof are properly aligned with a pair of automatic wrenches for tightening the valves.

It is still another object of the present invention to provide a pneumatic power and control system for enabling the synchronous operation of all operative components of the automatic indexing and valve tightening system of the present invention.

The objects of the present invention are fullfilled by providing: a continuous conveyor for transporting a plurality of FIGAL containers single-file through an inspection station; means for sensing the entrance of a FIGAL container into the region defined by the inspection station; clamp means for securing said FIGAL container as it enters said region of said inspection station and for rotating said container about its vertical axis; latch means for stopping the rotation of said FIGAL container at a position wherein the syrup valves on the top of the FIGAL container are in alignment with a pair of automatic wrenches disposed above the figal container; means for lowering said wrenches into engagement with said syrup valve when the rotation of said containers ceases; and means responsive to the engagement of said valve by said wrenches for causing said wrenches to apply a torque to said valves for a sufficient period of time to tighten the valves. After the expiration of that predetermined period of time, the clamp means and latch means are released enabling the assembly to clear the container and receive the next container in the series of containers moving along the continuous conveyor.

The clamping mechanism of the present invention includes four rubber covered vertically oriented rollers disposed in pairs on opposite sides of the conveyor. On a first side of the conveyor one of the two rubber covered vertical rollers is coupled to a drive motor for effecting rotation of the FIGAL container. The two rollers on the opposite side of the conveyor are not driven but are free to rotate about their axes as idler rollers in response to the rotation of the container. These roller pair including the drive roller is moveable transversly of the conveyor by a pneumatic piston in response to the sensing of the entrance of a FIGAL container in the region of the inspection station. Therefore, as a container enters the inspection station the drive roller pair moves transversly of the conveyor and presses the FIGAL container against the idler rollers on the opposite side of the container. The drive motor is then energized and the container begins to rotate. Rotation continues until a latch mechanism engages a discrete opening of a predetermined shape molded into the rubber skirt on the top of the FIGAL container. At this point in time the container stops its rotation and the wrenches disposed above the container are lowered into engagement with the pair of syrup valves located on the top of the container. The wrenches are then energized for a predetermined period of time sufficient for tightening the valves. When this period of time has expired the drive roller pair is retracted and the FIGAL container is permitted to continue on its path along the conveyor.

The apparatus of the present invention is designed to process containers at the rate of at least 650 per hour. The power source and controls of the present invention in a preferred embodiment are purely pneumatic. However, it should be understood that other controls, such as electrical controls, may be utilized without departing from the spirit and scope of the present invention.

BRIEF DESCRIPTION OF THE DRAWINGS

The present invention will become more fully understood by a detailed description given hereinbelow and the accompanying drawings which are given by way of illustration only and thus are not limitative of the present invention and wherein.

DESCRIPTION OF THE PREFERRED EMBODIMENTS

Figure 1:
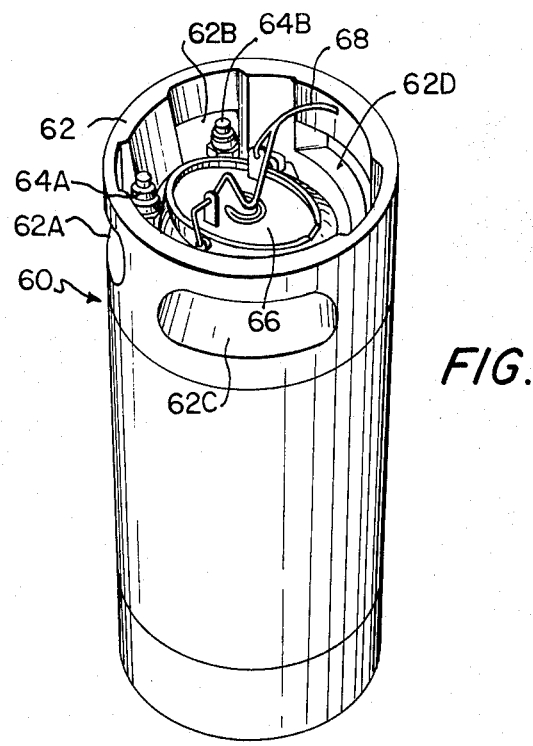
FIG. 1 is a perspective view of a typical FIGAL container to be processed through the automatic inspection station of the present invention.

Referring in detail to FIG. 1 there is illustrated a typical FIGAL container with which the automatic inspection station of the present invention is designed to operate. The container generally indicated 60, is fabricated of stainless steel or other suitable materials and includes a top rubber protective skirt 62. Skirt 62 has four openings about the periphery thereof, including openings 62A, 62B to give access to valves 64A, 64B, disposed on the top of the container and openings 62C and 62D forming handles, so that the container may be manually lifted. The top of the container also includes a closure member 66 which opens inwardly into the container when handle 68 is raised as shown in FIG. 1.

Two valves 64A and 64B are provided for the pressurization of the syrup in container 60 with $CO_2$ or nitrogen and the dispensing of the syrup from the container 60 when it is connected to a post-mix beverage dispenser, respectively. It is important that both of these valves 64A, 64B be tightened prior to filling the container 60 with syrup and pressurizing the same. The automatic inspection station of the present invention provides a means for automatically tightening these valves 64A, 64B as a plurality of containers, such as 60, are continually transported along a conveyor passing through the inspection station.

The openings 62C, 62D, as stated hereinbefore, are primarily provided to form handles by which the container 60 may be lifted. However, the system of the present invention makes use of these openings 62C and 62D as indexing elements for orientating the containers 60 at a predetermined angle about their vertical axes. The manner in which this is accomplished will become more fully apparent hereinafter with reference to the other Figures of the drawings. Suffice it to say at this time, that each of openings 62C and 62D have angular end walls oriented in, respectively, opposite directions which may be used as an indexing surface for the latch mechanism of the present invention. Either one of openings 62C, 62D may be utilized as the indexing opening depending upon the direction of the rotation of container 60. For example, it will be shown that when container 60 is rotated in a counterclockwise direction opening 62C is used as the indexing opening and when the container is rotated in a clockwise direction opening 62D may be used as the indexing opening.

Figure 2:
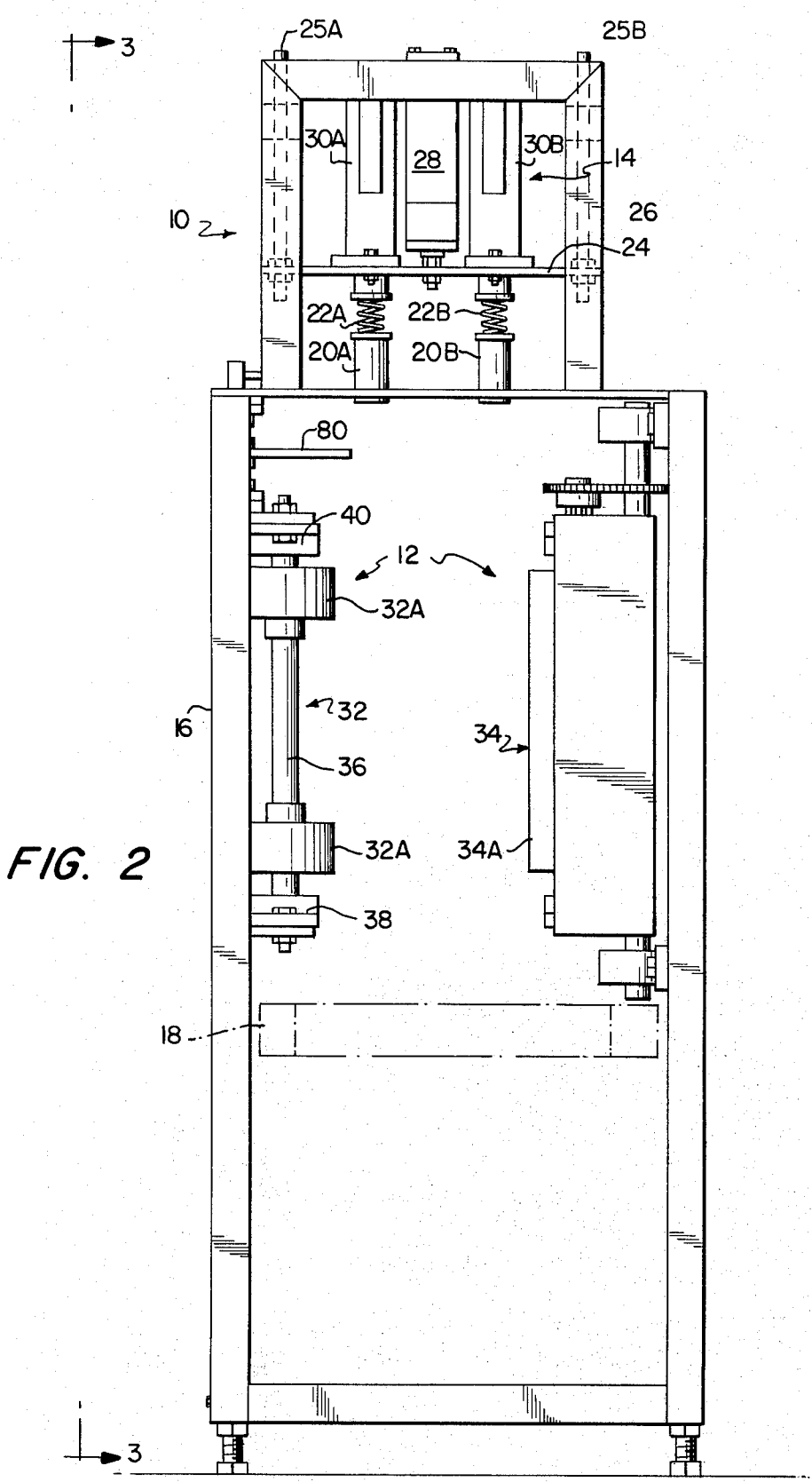
FIG. 2 is an end elevational view of the automatic inspection station of the present invention as viewed along the longitudinal axis of a conveyor passing therethrough.
Figure 3:
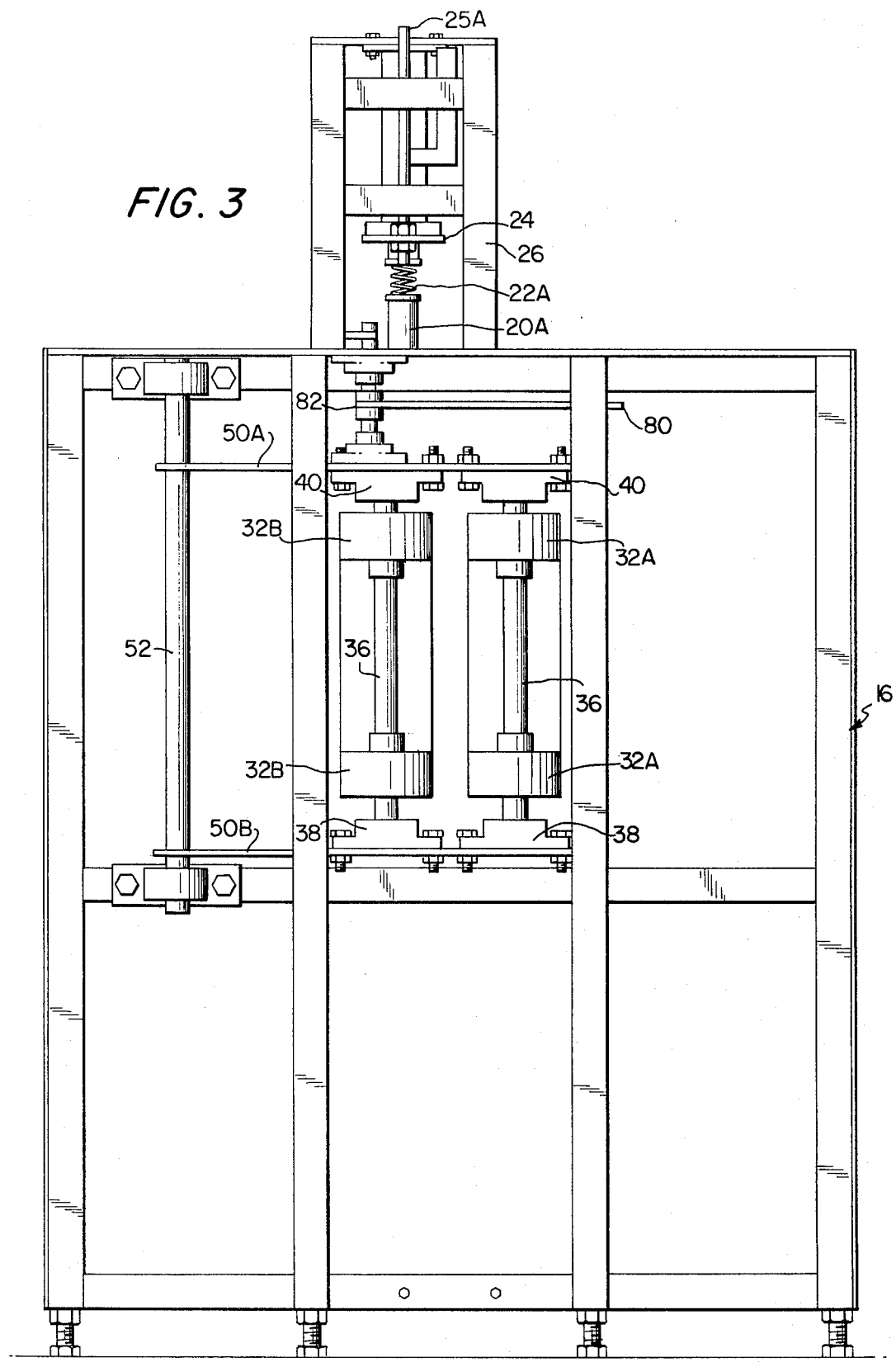
FIG. 3 is a front elevational view of the automatic inspection station of FIG. 2, as viewed in the direction of the arrows 2—2 illustrated in FIG. 2.

The apparatus of the present invention is generally illustrated in the elevational views of FIGS. 2 and 3 wherein FIG. 2 is an end view of the apparatus looking along the longitudinal axis of the conveyor and FIG. 3 is a front elevational view of the apparatus looking transversely of the conveyor axis. In FIG. 2 the conveyor is running in a direction perpendicular to the plane of the paper and into the same, and in FIG. 3 the conveyor is running from right to left of the Figure. The apparatus of the present invention is generally indicated 10 and includes an indexing mechanism 12 and a wrench tightening assembly, both of which are disposed over a conveyor 18 on a common frame 16.

The indexing mechanism 12 includes an idler roller assembly 32 including idler rollers 32A, 32B disposed on a pair of rotary shafts 36. As illustrated in FIG. 3 there are four idler rollers in all two of which engage the top of a container 60 and two of which engage the bottom of container 60. Thus, when the container 60 is in engagement with the idler rollers it is accurately supported on a predetermined vertical axis parallel to the shafts 36. Shafts 36 are journaled in top and bottom plates 40 and 38, respectively, and are free to rotate therein.

Figure 5:
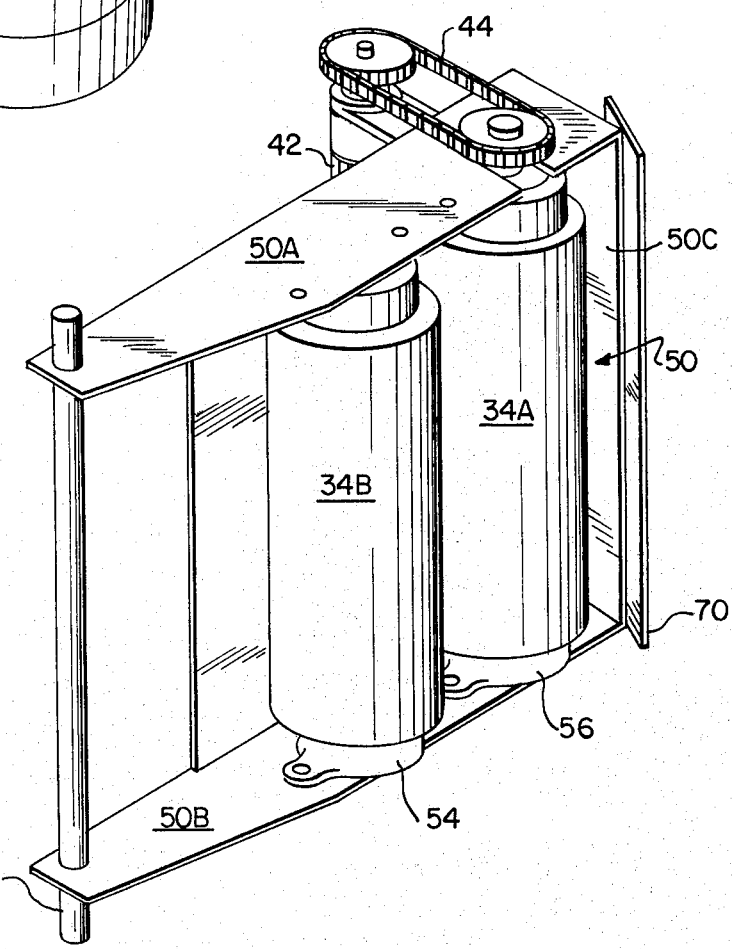
FIG. 5 is a perspective view illustrating the details of the drive rollers of the indexing mechanism of FIG. 3.

The indexing assembly 12 further includes a drive roller assembly 34 including a pair of vertically oriented rollers 34A and 34B. As illustrated in more detail in FIG. 5, roller 34A is coupled through a chain drive 44 to a pneumatic drive motor 52. The top of roller 34A is journaled in a support on a top plate 50A of a frame 50 adjacent end plate 50C and at the bottom is journaled into a support 56 mounted on a bottom plate 50B of frame 50. Roller 34B is not power driven and is merely journaled to rotate in top plate 50A and support 54 on bottom plate 50B. As will become more readily apparent hereinafter with reference to FIG. 4, during the operation of the apparatus of the present invention the entire frame 50 is pivotally mounted on shaft 52 journaled into frame 16, in a direction transverse to the longitudinal axis of the conveyor. When so moved in a direction toward the idler roller assembly 32 it will become apparent hereinafter that a container 60 moving along the conveyor will be clamped between the idler roller assembly 32 and drive roller assembly 34 in a vertical trough with a predetermined orientation with respect to the conveyor and the wrench assembly disposed thereabove. More specifically, the container will be clamped in a position wherein the wrench assembly 14 may be lowered to engage valves 64A, 64B disposed in the top of the container 60 described hereinbefore.

It should be understood that roller 34B may also be power driven if additional drive power is required for heavier containers.

The wrench assembly 14 is mounted within a frame 26 and includes a pneumatic piston 28 which raises or lowers a crossbar 24 in response to appropriate control signals to thereby raise or lower a pair of socket wrenches 20A, 20B with respect to the top of a FIGAL container 60. Crossbar 24 is mounted at its opposite ends for movement on a pair of vertical guide rods 25A, 25B which stabilize the vertical movement thereof. The socket wrenches 20A, 20B are driven by a pair of pneumatic motors 30A, 30B about their vertical axes in response to control signals to tighten valve 64A, 64B on the top of container 60. Coil spring 22A, 22B are provided to permit lateral flexing of the socket wrenches 20A, 20B to compensate for slight misalignments of the wrenches with respect to the container valves once the container is approximately indexed in the correct position. That is, in the event that the indexing mechanism orients the container just slightly off of its preferred position springs 22A, 22B will permit socket wrenches 20A, 20B to move laterally to accomodate slight misalignments.

Figure 4:
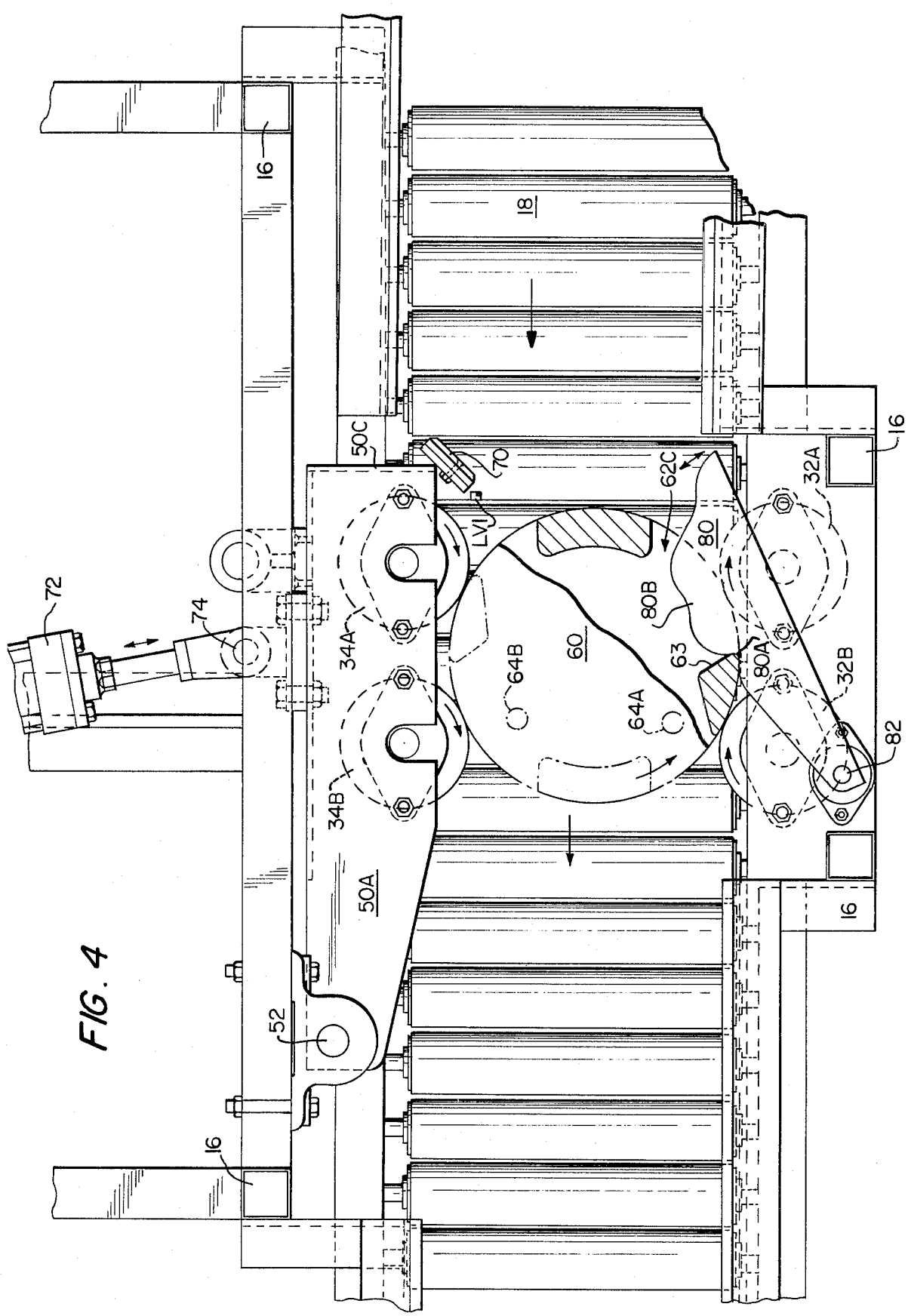
FIG. 4 is a top plan diagrammatic view of the automatic inspection station of the present invention which illustrates the operation of the automatic container indexing means of the present invention.

The operation of the apparatus of the present invention can best be illustrated by reference to FIG. 4 which is a top plan view of the apparatus of FIGS. 2 and 3 with the wrench assembly 14 removed. FIG. 4 illustrates a FIGAL container 60 oriented in its final position after indexing is completed. The conveyor 18 is moving from right to left in FIG. 4. As illustrated in FIG. 4 a pneumatically actuated piston 72 is provided which is pivotally coupled to the back of drive roller frame 50 at 74. Thus, actuation of piston 72 in response to appropriate control signals will either move drive roller assembly 34 transversely of the conveyor about shaft 52 toward idler roller assembly 32 or will retract frame 50 of drive roller assembly 34 back away from the idler rollers to unclamp a container 60.

A latch member 80 is provided which is pivotally mounted at pivot point 82 and biased for movement transversely of the container axis. Latch 80 is provided with an indexing notch 80A which indexes on angular wall surface 63 of opening 62C in container 60 in a manner to be more fully described hereinafter. Latch 80 is provided with a slight indentation at 80B to preclude the catching of latch 80 on any of the other elements on top of the container, such as handle 68. A bumper 70 is provided of plastic, or any other suitable material, for holding back the next container in line on the conveyor adjacent to the one being processed. A limit switch LV1 is provided in the region of the conveyor adjacent the entrance to the apparatus of the present invention to commence the operation of the system in a manner to be more fully described hereinafter with reference to FIG. 6.

Briefly, the operation of the apparatus as indicated in FIG. 4 is as follows. As a container 60 moving along conveyor 18 enters the region of the apparatus of the present invention adjacent bumper 70, limit switch LV1 is actuated which starts the operating cycle of the machine. The first step in the operating cycle is the actuation of the piston 72 to pivot drive roller frame assembly 50 about shaft 52. This clamps a container such as 60 in a vertically oriented trough between drive roller assembly 34 and idler roller assembly 32. Once clamped into position, drive roller 34A is rotated in a clockwise direction by pneumatic motor 42 causing the container 60 to rotate counterclockwise. Latch member 80 rides along the outside of the skirt 62 on container 60 until it locks within opening 62C on indexing surface 63. As can be seen from the drawings notch 80A on latch 80 becomes firmly locked against index surface 63. Once the container has locked in the orientation illustrated in FIG. 3 by latch 80, namely, with the center line of valve 64A, 64B disposed substantially perpendicular to the longitudinal axis of the conveyor, the wrench tightening assembly 14 is lowered so that sockets 20A, 20B engage valves 64A, 64B. The torquing motors 30A, 30B are then energized to rotate sockets 20A, 20B on valves 64A, 64B for a sufficient period of time to tightening the valves. Once the valves are tightened a control signal, within the circuit of FIG. 6 to be described hereinafter, causes piston 72 to retract drive roller assembly 34 thus unclamping container 60. Container 60 is then free to move downstream of the conveyor and the next container on conveyor 18 enters the apparatus, as before, actuating the start switch LV1.

Figure 6:
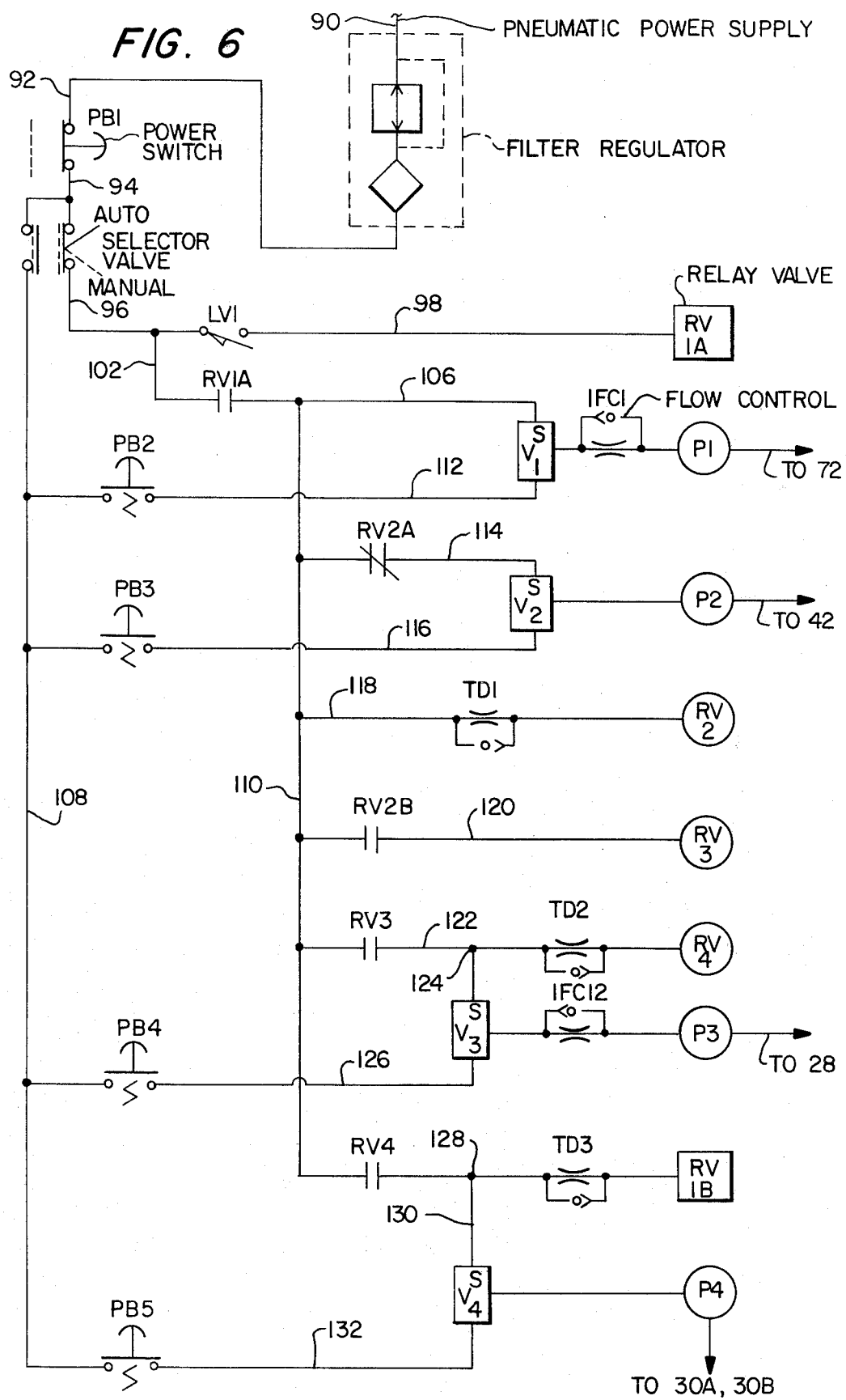
FIG. 6 is a schematic circuit diagram of the control circuit utilized in the present invention for performing the synchronous operation of the component parts of the apparatus of the present invention.

A preferred embodiment of a pneumatic control system suitable for operating the apparatus of FIGS. 2–5 is illustrated in FIG. 6. There is illustrated a main pneumatic power supply 90 with a filter regulator RF1 coupled through line 92 to a pushbutton power switch PB1. Power switch PB1 is connected in series via line 94 to a selector valve SV1 having automatic and manual positions for operation of the system. In the position shown in FIG. 6, selector valve SV1 is in the automatic position, which is the normal operating position of the system of the present invention.

When in the manual selector valve position, the pneumatic power supply is connected to line 108 having a plurality of parallel branches 112, 116, 126 and 132 connected thereto, which include manual pushbutton switches PB2, PB3, PB4 and PB5, respectively. The purpose of the manual pushbutton switches is to facilitate the operation of any portion of the machine individually without running the machine through the entire cycle. This is useful when it is desired to test the operation of the separate components of the machine individually.

On the automatic side of the control circuit of FIG. 6, that is the side coupled to line 96, there is a branch line 98 including cam position limit switch LV1 discussed hereinbefore with reference to FIG. 4 and a relay valve RV1A. Relay valve RV1A when actuated will close relay contacts RV1A in line 102. Contacts RV1A are coupled to a shuttle valve S1 via line 106. The other end of shuttle valve S1 is connected to pushbutton valve PV2 via line 112. Shuttle valve S1 has an output connected through a flow control valve IFC1 for applying a pressure P1 to piston 72 of FIG. 3. There is further provided a relay RV2 in line 118 and normally closed relay contacts RV2 put in line 114 coupled to one side of a second shuttle valve S2. The other side of shuttle valve S2 is coupled via line 116 to manual pushbutton valve PB3. An output of shuttle valve S2 is coupled to pneumatic motor 42 to apply a pressure P2 to cause said motor to drive or rotate drive roller 34A. Line 118 coupled to relay RV2 further includes a time delay switch TD1 which determines the period of rotation of motor 42. Relay contacts RV2B are also operative associated with relay RV2 in line 120 coupled at one end to main power supply bus line 110 and at the other end to a third relay RV3. Relay RV3 has normally open contacts RV3 in line 122 which is coupled at one end to power supply bus line 110 and at the other end through a second time delay switch TD2 to a fourth relay RV4. A third shuttle valve S3 is coupled to line 122 at junction 124 and through manual pushbutton switch PB4 via line 126. Shuttle valve S3 has an output through flow control valve ISC1 for applying a pressure P3 thereto to lower the wrench assembly 14 into engagement with the valve on the top of container 60. Contacts RV4 are provided in line 128 which are closed in response to actuation of relay RV4. Line 128 also includes a third time delay switch TD3 coupled to a fifth relay RV1B. A fourth shuttle valve S4 is coupled to line 28 via line 30 and to manual pushbutton switch PB5 via line 132. Shuttle valve S4 has an output to the torquing motors 30A, 30B to apply a pressure P4 thereto.

DESCRIPTION OF OPERATION

The operation of the system of the present invention can now be illustrated with reference to the control circuit of FIG. 6 in conjunction with the apparatus of FIGS. 2 to 5. The system is ready for operation when the main air supply 90 is turned on, power switch PB1 is energized, container 60 is unclamped, motor 42 is deengerized, torque motors 30A, 30B and wrench assembly 14 are retracted and unenergized, and the conveyor 18 is transporting containers 60 from right to left as indicated in FIG. 4. The automatic indexing and valve tightening is then ready to begin.

As a can 60 moves along conveyor 18 from right to left, as indicated in FIG. 4, the front edge of the can will strike limit switch LV1 closing the same. The closing of switch LV1 provides power through line 98 to energize relay valve RV1A closing relay contacts RV1A which opens shuttle valve S1 supplying pressure P1 to piston 72. Pressure being applied to piston 72 causes the piston to pivot drive roller frame 50 about shaft 52 thus clamping container 60 in a vertical trough between drive roller assembly 34 and idler roller assembly 32. Also upon the closing of relay contacts RV1A a pressure P2 is applied to motor 42, since relay contacts RV2 are normally closed supplying pneumatic pressure through the output of shuttle valve S2. At the same time upon the closing of contact RV1A power is supplied to timer switch TD1 and the timing function thereof commences. The time delay of TD1 is selected to give latch 80 a sufficient amount of time to index in opening 62C in the container skirt. As described hereinbefore, this indexing will occur as can 60 rotates counterclockwise causing notch 80A in latch 80 to lock or index on indexing surface 63. When timer TD1 times out the relay RV2 is energized opening the normally closed relay contacts RV2 and withdrawing pneumatic power from drive motor 42. Thus, drive motor 42 is deenergized and the can is no longer rotated.

The energization of relay RV2 as timer TD1 times out also closes normally open relay contacts RV2B thus energizing relay RV3 which closes relay contacts RV3C. The closing of relay contacts RV3C supplies a pressure P3 to piston 28 of wrench assembly 14 via shuttle valve S3 thus lowering the socket wrenches 20A, 20B onto valves 64A, 64B, respectively. Simultaneously, timer TD2 begins a timing cycle chosen to give wrench assembly 14 sufficient time to be lowered into engagement with the valve on the top of container 60. At this time when TD2 has timed out relay RV4 is energized thus closing normally open relay contacts RV4. The closing of relay contacts RV4 starts the operation of torque motors 30A, 30B by supplying pressure P4 thereto through shuttle valve S4. As the torquing motors 30A, 30B begin rotation time delay switch TD3 is activated to initiate a timing cycle thereof. The timing cycle of time delay TD3 is chosen so that the wrench assembly 14 has a sufficient amount of time to tighten the valve on the top of container 60. When timer TD3 times out relay RV1B is energized thus closing the first set of energized relay contacts RV1A thus removing power from bus line 110. Therefore, the torque motors 30A, 30B stop, piston 72 is retracted, and container 60 is released permitting it to continue on downstream of the conveyor. The cycle then repeats as the next container 60 on conveyor 18 strikes limit switch LV1.

As described hereinbefore, there is also provided manual actuating means for operating each portion of the machine separately and independently from the other portion by manually depressing push buttons PB2–PB5. The manual operation of these pushbuttons and how they effect the various components of the system of the present invention should be readily apparent from the above description of the automatic operation of those components.

It should be understood that the system described herein may be modified as would occur to one of ordinary skill in the art without departing from the spirit and scope of the present invention.

It is claimed:

1. An apparatus for automatically tightening valves on the tops of containers as said containers pass along a conveyor into a predetermined area, said containers having index openings of a predetermined characteristic shape therein comprising:
    wrench means disposed adjacent said predetermined area for tightening said valves;
    means for sensing the entrance of a container into said predetermined area and generating a signal indicative thereof;
    clamp means for securing said container on a fixed axis in response to said signal;
    means for rotating said container about said fixed axis;
    latch means for engaging said index opening and stopping the rotation of said container when said valves are aligned with said wrench means;
    means for constraining said wrench means to engage said valves;
    means responsive to the engagement of said valves by said wrench means for constraining said wrench means to apply a torque to said valves; and
    means for releasing said clamp means from said container when said valves are tightened.

2. The apparatus according to claim 1, wherein said wrench means include pneumatically powered motor means for applying a torque to said valves.

3. The apparatus according to claim 1, wherein said clamp means comprises:
    first roller means disposed on one side of said conveyor including at least one power driven roller;
    second roller means disposed on the opposite side of said conveyor; and
    actuator means for moving either of said roller means toward the other roller means to clamp said container therebetween in response to said signal from said means for sensing.

4. The apparatus according to claim 3, wherein said first roller means includes a pair of rollers, one of said pair being power driven, and said second roller means includes a pair of rollers which are not power driven but which are free to rotate with said container.

5. The apparatus of claims 3 or 4, wherein said first roller means is mounted on a lever and said actuator means comprises a pneumatic cylinder for pivoting said lever.

6. The apparatus according to claim 1, wherein said latch means comprises a lever which rides along the periphery of said container until it reaches said index opening, said lever having a notch which locks in said index opening.

7. The apparatus according to claim 1, wherein said wrench means includes sockets for receiving said valves.

8. The apparatus of claim 7, wherein said sockets are mounted on resilient support means which permit limited movement of said sockets with respect to said valves.

* * * * *